June 16, 1964

J. H. DE ZOLT 3,137,029

GROUND MEAT PATTY FORMING MACHINE

Filed Dec. 20, 1960

INVENTOR
John H. De Zolt, deceased
Fern A. De Zolt, executrix

W. J. Eccleston
ATTORNEY

June 16, 1964 J. H. DE ZOLT 3,137,029
GROUND MEAT PATTY FORMING MACHINE
Filed Dec. 20, 1960 2 Sheets-Sheet 2
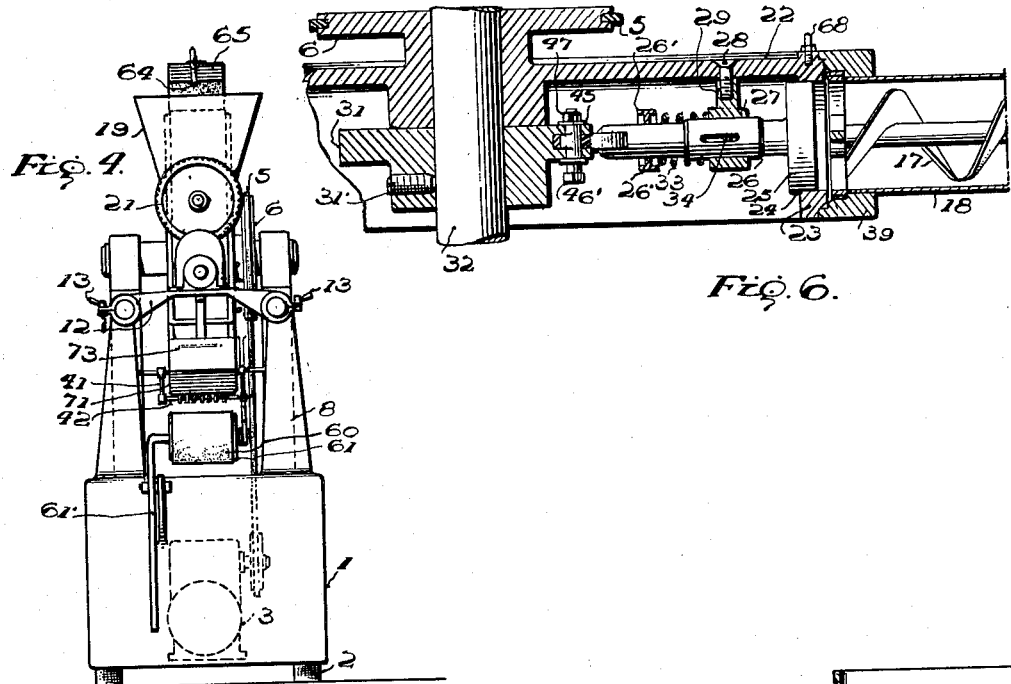
Fig. 4.
Fig. 6.
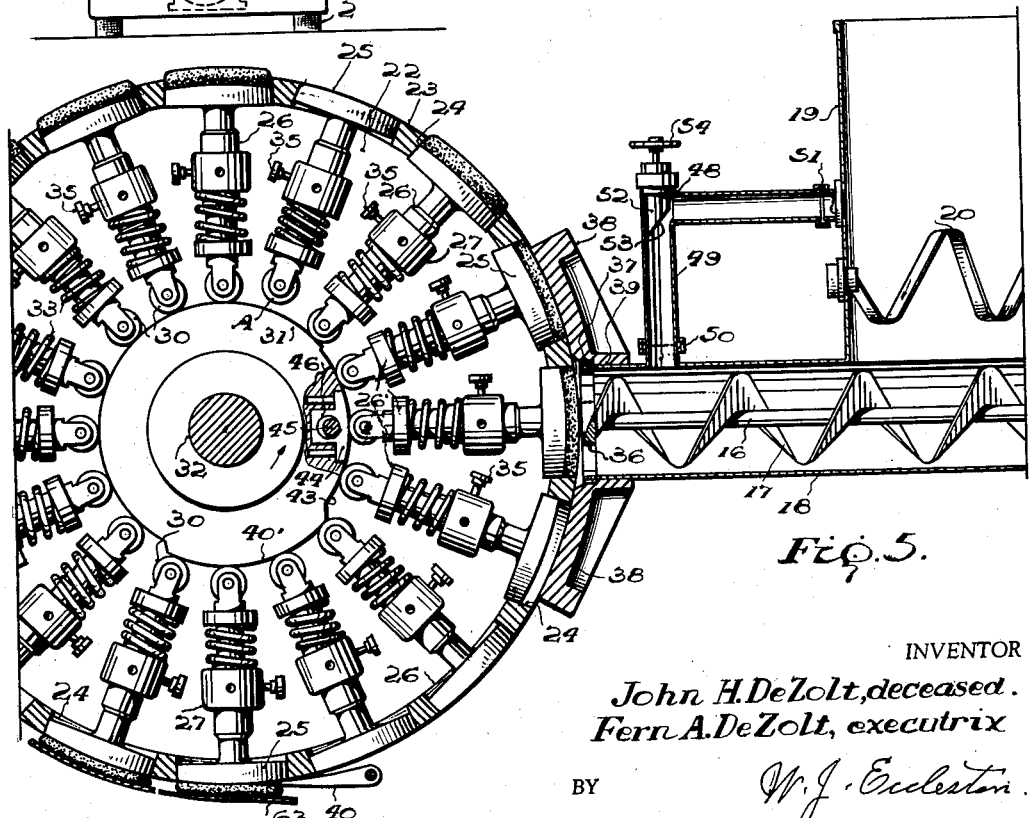
Fig. 5.
INVENTOR
John H. DeZolt, deceased.
Fern A. DeZolt, executrix
BY W. J. Eccleston
ATTORNEY 3,137,029
GROUND MEAT PATTY FORMING MACHINE
John H. De Zolt, deceased, late of New York, N.Y., by Fern A. De Zolt, executor, 42—18 216th St., Bayside 61, N.Y.
Filed Dec. 20, 1960, Ser. No. 77,255
11 Claims. (Cl. 17—32)
(Granted under Title 35, U.S. Code (1952), sec. 266)

The invention described herein may be manufactured and used by or for the Government for governmental purposes, without the payment to me of any royalty thereon.

This invention relates to meat patty-forming machines and has for its object to provide a completely integrated machine for forming the patties, stacking them in piles with separating sheets between them and on the top and bottom of the piles.

Another object of the invention consists in providing such a device in which the number of patties in each stack or pile may be readily varied.

A still further object of the invention consists in providing a patty-forming machine in which adjustments may be made for varying the thickness of the patties and other adjustments for varying the pressure applied to the meat which forms the patties.

A further object of the invention resides in so mounting the various parts of the mechanism which come in contact with the meat that they may be readily disconnected and separated into individual elements for cleaning and sterilization.

Other objects and advantages of the invention will be apparent from the following description taken in connection with the accompanying drawings, in which FIGURE 1 is a side elevational view of the patty-forming or molding machine;

FIGURE 4 is an end view of the complete apparatus;

FIGURE 5 is an enlarged fragmentary detail sectional view of the molding wheel and the pressure-forming mechanism associated therewith taken along the line 5—5 of FIG. 2; and FIGURE 6 is an enlarged detail view of the mold in its position to receive ground meat from a screw conveyor.

Figure 1:
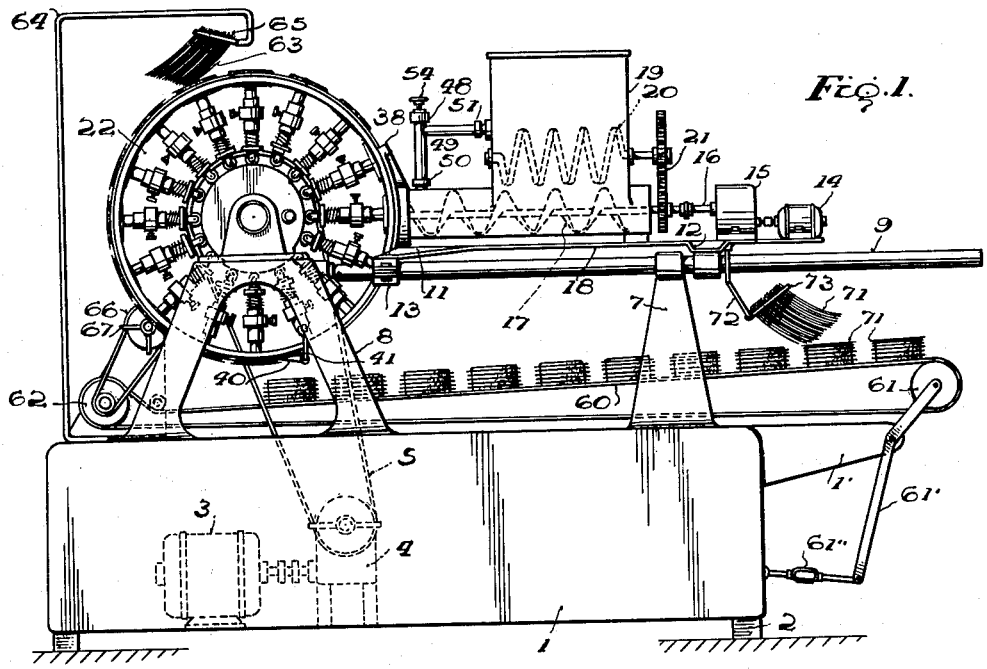

Referring to the drawings in greater detail and by reference numerals,

The number 1 indicates a hollow base mounted on legs 2 having positioned therein an electric motor 3 and reduction gearing 4 for operating a driving belt 5. This belt 5 extends over a pulley wheel 6 and serves to drive the molding wheel to be later described.

Mounted on the upper surface of the base 1 are pairs of standards 7 and 8 which serve to support a pair of rails 9 which in turn support a table 10. This table is provided with legs 11 and 12 by means of which it is slidably supported on the rails 9 and is normally held against movement along the rails by means of setscrews 13. Also mounted on the table 10 is a motor 14 associated with reduction gearing 15 for rotating a shaft 16 on which is mounted a screw conveyor 17. Conveyor 17 is positioned within a tube 18 which depends from and communicates with the open bottom of a hopper 19 in which the ground meat for use in forming the patties is located. Within the hopper 19 is an agitator 20 which is driven from the shaft by means of gearing 21.

The wheel for carrying the molds for the meat patties so that they will be successively aligned with the tube 18 in which the screw conveyor 17 is located is indicated generally by the numeral 22. Wheel 22 is provided with an annular flange 23 (FIG. 6) and this flange is provided with a plurality of mold-forming openings 24, there being sixteen (16) such openings in the present illustration. Slidably mounted in each of these mold cavities 24 is a mold bottom 25 which is fixed to the outer end of a pusher rod or plunger 26. These several pusher rods or plungers are slidably mounted in sleeves 27 and may be secured to the wheel 22 in any preferred manner. In the present illustration, however, screws 28 are located in the side of the wheel 22 and threadedly receive a boss 29 formed on the sleeve 27. The lower end of each pusher rod 26 is provided with a roller 30 which rides upon a cam 31 fixed to a shaft 32 by means of a setscrew 31', and on which the mold wheel 22 is rotated by means of pulley 6 heretofore referred to and which is rotated by means of belt 5. Adjacent the inner end of each of the pusher rods or plungers 26 is a shoulder 26' and interposed between this shoulder and the sleeve 27 is a coil spring 33 which serves to bias each of the rollers 30 against the fixed cam 31. Rotation of the mold bottom is prevented by reason of a pin and slot connection 34 between the pusher rod and its sleeve 27. Each of the sleeves 27 is provided with a setscrew 35 which is adapted to engage its pusher rod or plunger 26 to hold it in fixed position with relation to the sleeve but also rendering it adjustable with respect thereto. This adjustment is particularly useful for reasons set forth below.

The molds 24–25 are successively brought into alignment with tube 18 of the screw conveyor and the meat product is forced into the mold as it passes the mouth of the tube. In order to produce a patty having a smooth upper surface, a fixed knife 36 is located in a ring 37 which is positioned at the end of the tube 18 and thus serves to smooth the meat product within the mold as the latter passes by the mouth of the tube. The face of the patty is further smoothed as it passes an upper shoe 38 of the pair of shoes which form a part of a ring 39 fixed to the adjacent end of the tube 18.

By viewing FIGURE 5, it will be noted that the fixed cam 31 is shaped so as to raise the mold bottoms after they have passed the mouth of the tube 18 and the upper end of the shoe 38 so that the meat patty is caused to protrude partway out of its mold 24. As the wheel continues around, the cam-engaging rollers 30 are caused to engage a portion 40' of the cam 31 which is additionally raised so as to cause the mold bottoms 25 to project the formed patties completely out of their molds. This operation occurs when the mold reaches its lowest position and a scraper 40 is located at that point to forcibly remove the patty from the mold bottom 25. These scrapers 40, of which there are a plurality, are arranged transversely of the wheel as shown in FIGS. 4 and 5 and are suspended by means of brackets 41 and the series of scrapers is resiliently mounted on crossbars 42 which connect the brackets.

As the wheel 22 continues to rotate, the pusher rods or plungers 26 reach depressed point 43 on the cam 31, thereby bringing the related mold bottoms 25 back into the lower portion of the mold body. At the point directly opposite the charging point of the molds, i.e., the mouth of the tube 18 and of the screw conveyor 17, the cam 31 is provided with a cutout portion to permit the positioning therein of an adjustable cam portion 44. This cam is radially slidable in the cam 31 and is provided with an eccentric 45 positioned in an opening 46 in the cam body. This detail is more clearly shown in FIG. 6, and it will be noted that the eccentric 45 is provided with an adjusting knob 46' on one end and a nut 47 on the other end for securing it in position. By means of this adjustment, the cam portion 44 may be moved toward or from the periphery of the wheel rim 23, and hence provide an adjustment for the mold bottom 25 as it is charged with ground meat from the hopper 19. If it is desired to make the patty of a maximum thickness, the eccentric 45 is rotated to the point which will bring the cam portion 44 into its lowest position. On the other hand, if it is desired to make patties of less thickness, the eccentric is rotated so as to project the cam portion 44 toward the rim of the wheel. Thus, patties of any desired thickness may be provided by adjusting the cam portion 44 of the circular cam 31. In order to compact the individual patties to the desired density, a recirculating member 48 is provided. This element is shown in FIG. 5 and consists in this specific illustration of a by-pass comprising a right angular pipe 49, one end of which is detachably connected to the tube 18 by a coupling joint 50 and the other end is detachably connected to the hopper 19 by a coupling joint 51 so that this element may be removed for cleaning purposes when desired.

Mounted at the angle of the pipe 49 is a valve or gate consisting of a plug 52 provided with a beveled portion 53. This plug is vertically adjustable by means of a hand wheel 54 and when forced downwardly, the plug will completely close the vertical portion of the pipe 49 thereby preventing the recirculation of the meat product. It will be understood that by varying the adjustment of the plug 52, the back pressure provided is quickly varied so as to vary the compactness of the material within the molds, as may be desired.

Means is provided for conveying the meat patties away from the immediate point of manufacture and to this end a belt conveyor 60 is provided which is reeved over pulleys 61, 62 adjacent the opposite ends of the apparatus and directly above the base member 1. The upper run of this conveyor receives the patties at a single discharge point as they are forced off the mold bottoms by the scrapers 40 but before this is done the patty has picked up a paper wafer 63 from the stack which is supported adjacent the top of the molding wheel by means of a bracket 64 which carries a paper holder 65. It is to be understood, of course, that these wafer-coated patties are to be piled into stacks at said discharge point before being moved along by the conveyor 60 and the number of patties in each stack may be varied in a manner which will now be described. Conveyer 60 is adjusted by means of a bellcrank 61' which carries the pulley 61 and may be adjusted through the medium of turnbuckle 61" connected to its lower end and to the arm 1' of base 1.

Figure 3:
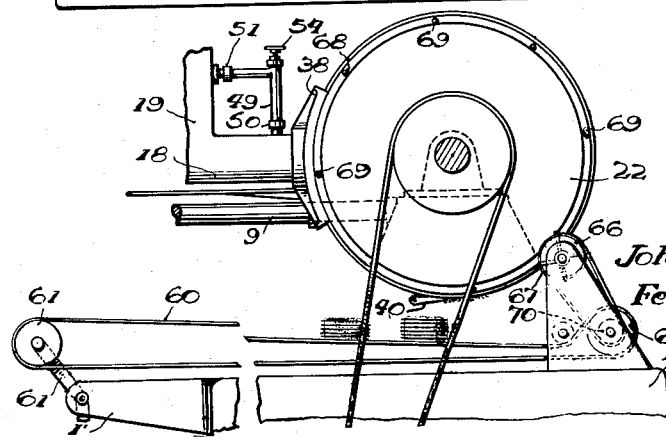
FIGURE 3 is a fragmentary side elevational view of the molding wheel and related parts.

The belt conveyor is operated through the medium of a paddle wheel 66 which operates a belt 67 which is geared to the wheel 62 of the belt conveyor 60 by means of a pulley wheel 70. This paddle wheel is rotated from time to time by means of a pin 68 which is located in a side edge of the molding wheel 22. This wheel is provided with a series of apertures 69 so that the pins may be positioned as desired to provide the number of patties per stack as previously determined. In this connection, it will be noted in FIGURE 3 that the paddle wheel 66 is of larger diameter than pulley wheel 70 around which the belt 67 is also reeved so that the pulley 62 on the same shaft as the wheel 70 will travel faster than the paddle wheel 66 so that when the pin 68 rotates the paddle wheel 66, it will cause the stack of patties to be displaced to the left (FIG. 3) to provide a space for the formation of a new stack. In the present illustration, there are sixteen molds provided on the wheel 22 and it is intended to form stacks of 7 patties each, this being necessary due to the fact that two molds diametrically opposed must be rendered inoperative to provide the necessary time interval between the stacking of the top patty on one stack and the dropping of a new patty for the start of a succeeding stack. This feature is illustrated in FIG. 5 wherein the mold bottom 25 just to the right of the topmost mold bottom is locked in its fully projected inoperative or patty ejecting position with its wheel 30 spaced from the cam 31 as indicated by the letter A in this figure. Thus, the conveyor belt 60 is advanced periodically after a selected interval of time and the duration of such selected interval is a predetermined multiple of the normal time between between the deposit of successive patties on said conveyor.

As the stacks of patties travel with the belt 60 toward the right in FIGURE 1, the upper patty of a stack will come in contact with the lower wafer of a package of paper wafers 71 supported from the table 10 by means of a bracket 72 and a paper holder 73. This contact of the exposed upper wafer which is, of course, more or less sticky, will engage the lowermost wafer of the stack and tear it therefrom so as to form a top cover for the entire stack. The stack of patties is now complete and may be removed from the belt 60 by hand or otherwise disposed of as may be deemed desirable.

In the operation of the device, the pin or pins 68 are first positioned in the apertures 69 of the molding wheel so as to insure the desired number of patties in each stack. Thereafter the two stacks of paper wafers 63 and 71 are placed in position and the stack 71 adjusted vertically so as to accommodate itself to the height of the stacks of patties which are to be formed. Also, the necessary mold bottoms are rendered inoperative in order to provide the required time interval for the shifting of completed stacks of patties. Also, the cam portion 44 is adjusted by means of the eccentric 45 to provide for the required thickness of the meat patties. Thereafter, the meat product is charged into the hopper and the mechanism set in operation. In order to secure the desired compactness of the patties, the nob 54 is turned to adjust the plug 52 so as to obtain the desired back pressure within the pipe 49. As the mold wheel rotates, the molds are successively charged with the materials as they pass screw conveyor 17, spreading knife 36, and upper shoe 38 so as to provide the desired smooth product. As the molds progress, the pusher rods or plungers ride up on the enlarged portion 40' of the cam 31 to thereby project the patty out of the mold. As the partly projected patty reaches the bottom of the wheel, it tends to separate from the mold bottom 25 by the force of gravity, but it is also assisted by means of the scraper bars 40 to thereby fall upon the conveyor 60. In this progress around the wheel, each of the patties withdraws one of the discs 63 from the holder 65 so that they are interposed between the various patties forming the stack. When the prescribed number of patties has been dropped from the stack, the pin 68 will operate the paddle wheel 66 through a quarter turn so as to thereby operate the conveyor 60 through the medium of the belt or sprocket chain 67. As the stacks reach the package of wafers 71, the lowest wafer will be engaged by the patty on the top of the stack and withdraw the same so as to cover the stack before it reaches the end of its travel, as heretofore stated, the completed stack being removed in any desired manner.

Figure 2:
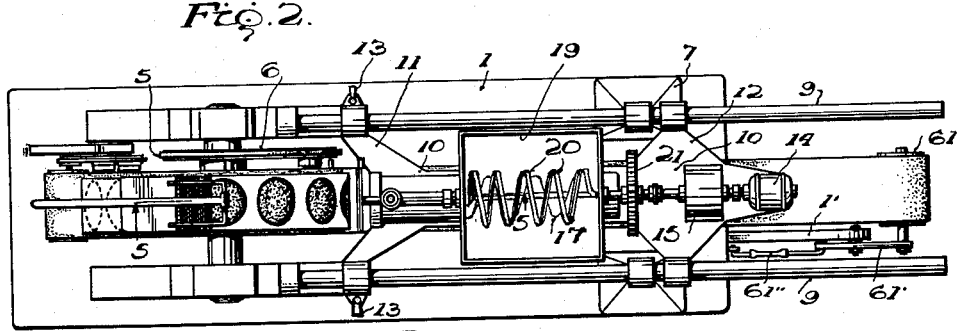
FIGURE 2 is a plan view thereof.

Such parts of the apparatus as come into direct contact with the ground meat may be formed of stainless steel. In order to thoroughly clean such parts of the apparatus, the setscrews 13 are released and the table 10 and related parts may be moved along the rails 9 to the right as shown in FIGS. 1 and 2, thereby allowing the withdrawal of the screw conveyor 17. Likewise, the coupling members 50 and 51 may be operated to release the pressure pipe 49 and its related parts for cleaning purposes.

In accordance with the patent statutes, I have described what I now consider to be the preferred form of the invention, but inasmuch as various minor changes may be made in structural details without departing from the spirit of the invention, it is intended that such changes be included within the scope of the appended claims.

What is claimed is:

1. A patty-forming machine comprising a molding wheel rotatable in an upright plane and having a plurality of mold cavities formed in a circular peripheral portion thereof, means disposed beside said peripheral portion for charging said mold cavities with material to be formed into patties, means including bottom forming means for said mold cavities reciprocable therein to eject formed patties from said cavities, cam means to reciprocate said reciprocable means in one direction, means for biasing said reciprocable means in the other direction, and means for releasably securing said reciprocable means in an inoperative position at the limit of the ejecting stroke thereof to vary the number of mold cavities in said wheel available to form patties.

2. An automatic patty-forming machine comprising, in combination, a rotatably mounted molding wheel having a plurality of annularly spaced mold cavities on the circumference thereof, a mold bottom in each of the mold cavities, said mold bottoms being slidably movable in the mold cavities radially with respect to the wheel, a fixed cam disposed radially inwardly of and substantially concentric with the wheel, a plurality of plungers each having a cam follower on an inner end thereof, the outer end of each of said plungers being connected to a respective mold bottom, means urging each of said plungers radially inwardly whereby said cam followers normally contact the fixed cam, a hopper, an extrusion tube feeder communicating with the hopper and successively with the mold openings on the wheel as each is aligned therewith, and a feed pressure regulating means operatively associated with said extrusion tube to regulate the feed pressure of the patties into the mold openings.

3. An automatic patty-forming machine comprising, in combination, a molding wheel mounted to rotate in a vertical plane having a plurality of annularly spaced mold cavities on the circumference thereof, a mold bottom in each of the mold cavities, said mold bottoms being slidably movable in the mold cavities radially with respect to the wheel, a fixed cam disposed radially inwardly of and substantially concentric with the wheel, a plurality of plungers each having a cam follower on an inner end thereof, the outer end of each of said plungers being connected to a respective mold bottom, spring biasing means urging each of said plungers radially inwardly whereby said cam followers normally contact the fixed cam, means provided in association with at least one of said mold bottoms for releasably securing the same in an inoperative outward radial position, a hopper, and an extrusion tube feeder communicating with said hopper and successively with said mold cavities on said wheel as each is aligned therewith.

4. An automatic patty-forming machine as defined in claim 3 including means for ejecting patties from said mold cavities, a step-by-step conveyor adapted to receive the ejected patties, and means driven by said molding wheel for advancing said conveyor during a period of time when an inoperative mold bottom is in the patty ejecting position.

5. A meat patty forming machine comprising a rotatably mounted wheel, a plurality of molds on said wheel, a meat hopper, a tube communicating with said hopper and receiving meat therefrom, said tube having a discharge end communicating successively with said molds as said wheel is rotated, a screw conveyor in said tube for forcing meat therethrough into said molds, a pipe having one end in communication with said tube and a second end in communication with said hopper, a continuously adjustable valve for controlling the pressure applied to the meat as the same is forced through said tube, and said valve being disposed entirely in said pipe between said ends thereof in all positions of said valve whereby to provide a continuous and unobstructed free passageway through said tube in all positions of said valve.

6. A meat patty forming machine comprising a rotatably mounted molding wheel provided with an annular series of molds, means for filling said molds with compressed meat, said molds having movable mold bottoms, means for operating said mold bottoms to eject patties formed in said molds at a single discharge point, means for automatically removing each patty from each mold at said discharge point, stacking means for stacking selected numbers of said patties at said discharge point said stacking means comprising a conveyor on which patties removed by said patty removing means are received and automatically stacked, means associated with the rotation of said molding wheel for advancing said conveyor periodically after a selected interval of time, the duration of each such selected interval being a predetermined multiple of the time between the deposit of each patty on said conveyor, whereby to obtain stacks containing a selected number of patties, and means for varying said interval to provide for the deposit of stacks containing a varying number of patties.

7. A meat patty forming machine comprising a rotatably mounted molding wheel formed with an annular series of molds having reciprocable mold bottoms, means for filling said molds to form patties, means for operating said mold bottoms to and from retracted mold cavity-forming positions and projected patty ejecting positions, and means for automatically removing each patty from a projected mold bottom at a single discharge point, stacking means for stacking selected numbers of said patties at said discharge point, said stacking means comprising a normally stationary conveyor, means associated with said molding wheel for intermittently actuating said conveyor to convey a stack of patties away from said discharge point, means releasably securing at least one of said mold bottoms in said projected patty ejecting position, thereby providing a period of time between the depositing of successive stacks of patties on said conveyor at said discharge point, said conveyor actuating means being adapted to be operable during said period.

8. A meat patty forming machine according to claim 7, in which prior to reaching said discharge point, means are provided for moving each said mold bottom having a patty supported thereon to a partially projected position, and wafer applying means for applying a protective wafer to each partially projected patty.

9. A patty forming machine according to claim 8, there being means for adjusting said conveyor toward and away from said molding wheel to adapt said conveyor to receive stacks of patties of different height, means for applying a protective wafer to the top of each stack as the same is moved away from said discharge point on said conveyor, and means for adjusting said last named means to adapt the same to stacks of varying height.

10. A patty forming machine according to claim 8, wherein said conveyor includes means for adjusting the same toward and away from said molding wheel to adapt said conveyor to receive patty stacks of varying height.

11. An automatic patty forming machine as defined in claim 2, including a plurality of sleeves secured to said molding wheel, there being a sleeve cooperating with each plunger, and each plunger being slidably disposed in its sleeve.

References Cited in the file of this patent

UNITED STATES PATENTS

| | | |
|---|---|---|
| 1,473,590 | Wallace | Nov. 6, 1923 |
| 1,847,690 | Hottmann | Mar. 1, 1932 |
| 2,000,027 | Kazanjian | May 7, 1935 |
| 2,010,524 | McClatchie | Aug. 6, 1935 |
| 2,324,202 | Felton | July 13, 1943 |
| 2,554,821 | Garfunkel | May 29, 1951 |
| 2,666,229 | Vogt | Jan. 19, 1954 |
| 2,708,287 | Long et al. | May 17, 1955 |
| 2,757,411 | Condon | Aug. 7, 1956 |
| 2,770,202 | Garfunkel | Nov. 13, 1956 |